(12) United States Patent
Sinharoy

(10) Patent No.: US 6,976,157 B1
(45) Date of Patent: Dec. 13, 2005

(54) CIRCUITS, SYSTEMS AND METHODS FOR PERFORMING BRANCH PREDICTIONS BY SELECTIVELY ACCESSING BIMODAL AND FETCH-BASED HISTORY TABLES

(75) Inventor: Balaram Sinharoy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/435,070

(22) Filed: Nov. 4, 1999

(51) Int. Cl.[7] .............................................. G06F 9/00
(52) U.S. Cl. ..................... 712/239; 712/237; 717/161
(58) Field of Search .............................. 712/205–207, 712/233–240; 377/20, 52

(56) References Cited

U.S. PATENT DOCUMENTS

| | | | |
|---|---|---|---|
| 5,142,634 A | | 8/1992 | Fite et al. |
| 5,367,703 A | | 11/1994 | Levitan |
| 5,414,822 A | * | 5/1995 | Saito et al. ................... 712/240 |
| 5,553,253 A | | 9/1996 | Pan et al. |
| 5,564,118 A | | 10/1996 | Steely, Jr. et al. |
| 5,706,322 A | * | 1/1998 | Scalo et al. .................... 377/20 |
| 5,737,381 A | * | 4/1998 | Shimomura et al. ........... 377/52 |
| 5,758,142 A | * | 5/1998 | McFarling et al. .......... 712/233 |
| 5,794,028 A | | 8/1998 | Tran |
| 5,805,878 A | | 9/1998 | Rahman et al. |
| 5,875,325 A | | 2/1999 | Talcott |
| 5,935,238 A | * | 8/1999 | Talcott et al. ................ 712/206 |
| 5,964,869 A | | 10/1999 | Talcott et al. ................ 712/236 |
| 6,233,678 B1 | * | 5/2001 | Bala ............................ 712/240 |
| 6,272,624 B1 | * | 8/2001 | Giacalone et al. ........... 712/239 |
| 6,289,441 B1 | * | 9/2001 | Talcott et al. ................ 712/239 |
| 6,332,189 B1 | * | 12/2001 | Baweja et al. ............... 712/238 |
| 6,374,349 B1 | * | 4/2002 | McFarling .................... 712/239 |

OTHER PUBLICATIONS

Patt et al. "Alternative Implementations of Hybrid Branch Predictors", Proceedings of the 28th Annual Symposium on Microarchitecture, 1995, pp. 252-257.*
Hennessy et al. Computer Architecture: A Quantitative Approach, Morgan Kaufmann Publishers, Inc.; 1996; pp. 269.*
Patt et al., "Alternative Implementations of Two-Level Adaptive Branch Prediction", The 19th Annual Symposium on Computer Architecture, 1992; pp. 124-134.*
Chang et al., "Branch Prediction Using Both Global and Local Branch History Information", IEEE Proc.-Computer Digital TEch., vol. 149, No. 2, Mar. 2002; pp. 33-38.*

(Continued)

*Primary Examiner*—Kakali Chaki
*Assistant Examiner*—William H. Wood
(74) *Attorney, Agent, or Firm*—Winstead Sechrest & Minick P.C.; Mark E. McBurney

(57) ABSTRACT

Branch prediction circuitry including a bimodal branch history table, a fetch-based branch history table and a selector table is provided. The local branch history table includes a plurality of entries each for storing a prediction value and accessed by selected bits of a branch address. The fetch-based branch history table included a plurality of entries for storing a prediction value and accessed by a pointer generated from selected bits of the branch address and bits from a history register. The selector table includes a plurality of entries each for storing a selection bit and accessed by a pointer generated from selected bits from the branch address and bits from the history register, each selector bit is used for selecting between a prediction value accessed from the local history table and a prediction value accessed from the fetch-based history table.

21 Claims, 12 Drawing Sheets

OTHER PUBLICATIONS

McFarling, Scott; "Combining Branch Predictors"; Western Research Laboratory, Digital; Jun. 1993.*

Patt et al.; "Alternative Implementations of Hybrid Branch Predictors"; IEEE; 1995; p. 252-257.*

Sippl et al.; "Computer Dictionary and Handbook"; Howard W. Sams & Co., Inc.; 1982; pp. 118, 119, 209.*

"Drummond" James R.; "Instant Counters—A Primer for the Ignorant or Forgetful"; Oct. 1997; pp. 1-4.*

* cited by examiner

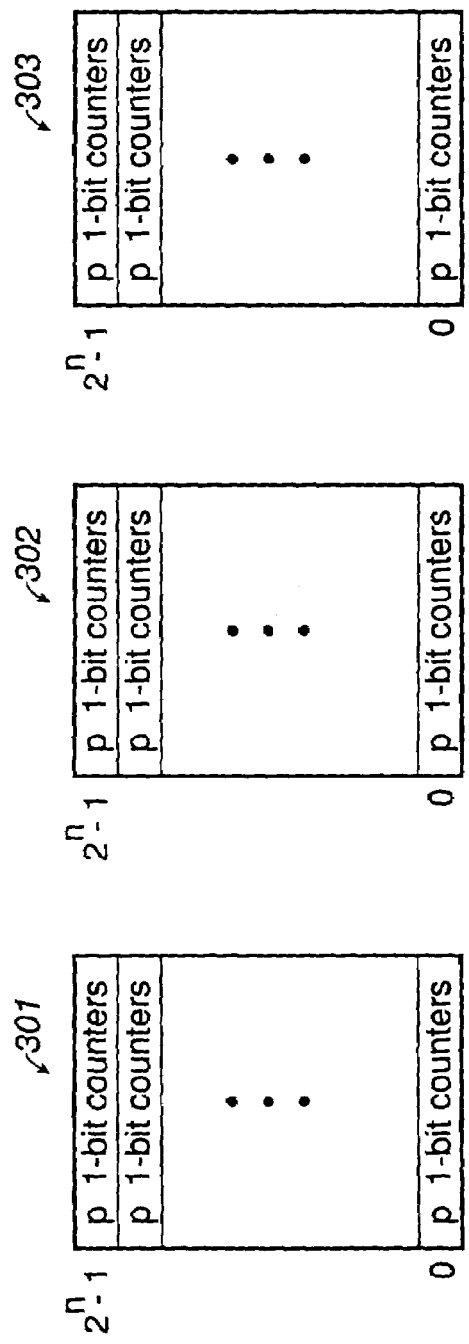

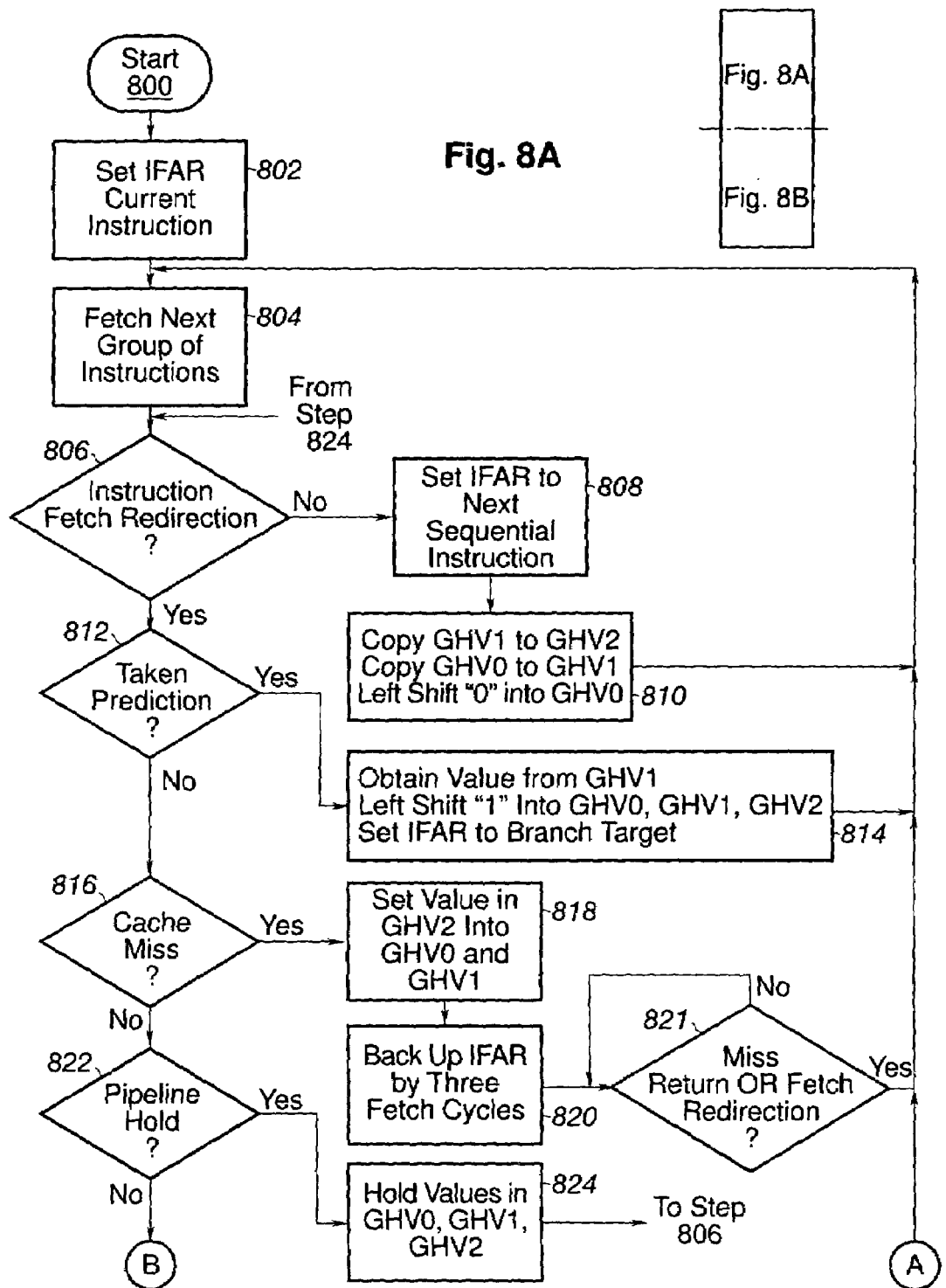

CIRCUITS, SYSTEMS AND METHODS FOR PERFORMING BRANCH PREDICTIONS BY SELECTIVELY ACCESSING BIMODAL AND FETCH-BASED HISTORY TABLES

CROSS-REFERENCE TO RELATED APPLICATION

The present invention is related to the following U.S. Patent Application filed concurrently herewith and hereby incorporated herein by reference:

Ser. No. 09/434,856 entitled "Apparatus and Method for Controlling Link Stack Corruption During Speculative Instruction Branching;" and Ser. No. 09/434,763 entitled "Apparatus and Method for Accessing a Memory Device During Speculative Instruction Branching."

TECHNICAL FIELD

The present invention relates generally to instruction pipelining in processing systems, and in particular to circuits, systems and methods for performing branch predictions by selectively accessing bimodal and fetch-based branch history tables.

BACKGROUND INFORMATION

Modern high frequency microprocessors are typically deeply pipelined devices. For efficient instruction execution in the pipelined machines, instructions are fetched and executed speculatively. In other words, a prediction is made about the direction and target of the branch instructions being fetched many cycles before the branch actually gets executed. When the branch is executed, the direction and the target of the branch are determined. If it is determined that the branch has been mispredicted (either its target or its direction), then the branch instruction is completed and all successive instructions are flushed out of the instruction pipeline and new instructions are fetched either from the sequential path of the branch (if the branch is resolved as not taken) or from the target path of the branch (if the branch is resolved as taken).

Many branch prediction techniques have been developed. For example, in Bimodal Branch Prediction, selected bits from a branch address are used as a pointer to a branch history table. The entries to this table maintain a history as to the number of times a corresponding branch instruction is actually taken during instruction execution versus the number of times that branch instruction is not taken. From this history, a prediction can be made as to the probability that an instruction will be taken during instruction execution and therefore whether a sequential instruction following that branch instruction or the target of the branch instruction should be fetched into the instruction pipeline.

Other branch prediction techniques include Gobal Branch Prediction, Global Predictor with Index Selection (Gselect) and Global History with Index Sharing (Gshare). Often, execution of a branch instruction will depend on the execution of a previous instruction. Therefore, in these schemes, a global history shift register is used which stores history bits for a given number of previously executed branch instructions. The history bits tag if the corresponding branch was taken or not taken. The entries in the register are then used to address a global branch history table holding prediction values. In Gselect, bits from previously executed instructions are combined with selected bits from the current branch instruction to address the global branch history table. In Gshare, an XOR operation is performed using the register contents and bits from the address of the current cache line to generate the pointer to the table.

Each of the existing schemes is subject to disadvantages, either in prediction accuracy, amount of hardware (e.g. the number of arrays required for the tables), or speed. Thus, the need has arisen for more efficient methods circuits and methods for performing branch prediction.

SUMMARY OF THE INVENTION

According to the principles of the present invention, branch prediction circuitry is disclosed which included a bimodal branch history table, a fetch-based branch history table and a selector table is provided. The bimodal branch history table includes a plurality of entries each for storing a prediction value and accessed by selected bits of a branch address. The fetch-based branch history table has a plurality of entries for storing a prediction value and accessed by a pointer generated from selection bits of the branch address and bits from a history register. The selector table comprises a plurality of entries each for storing a selection bit and accessed by a pointer generated from selected bits from the branch address and bits from the history register, each selector bit is used for selecting between a prediction value accessed from the bimodal history table and a prediction value accessed from the fetch-based history table.

In the preferred embodiments of the present inventive principles, circuitry systems and methods combine bimodal branch prediction with fetch-based branch prediction using only three tables. In addition to minimizing circuitry, the present inventive concepts do not require extensive and/or complicated schemes for accessing these tables, as was required in the prior art.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2B illustrates in further detail a portion of the selected operational blocks of FIG. 2A.

FIG. 3B illustrates in further detail a portion of the branch prediction circuitry of FIG. 3A;

FIGS. 8A and 8B illustrate, in flowchart form, a methodology for generating a global history vector (GHV) in accordance with an embodiment of the present invention.

DETAILED DESCRIPTION

Figure 1:
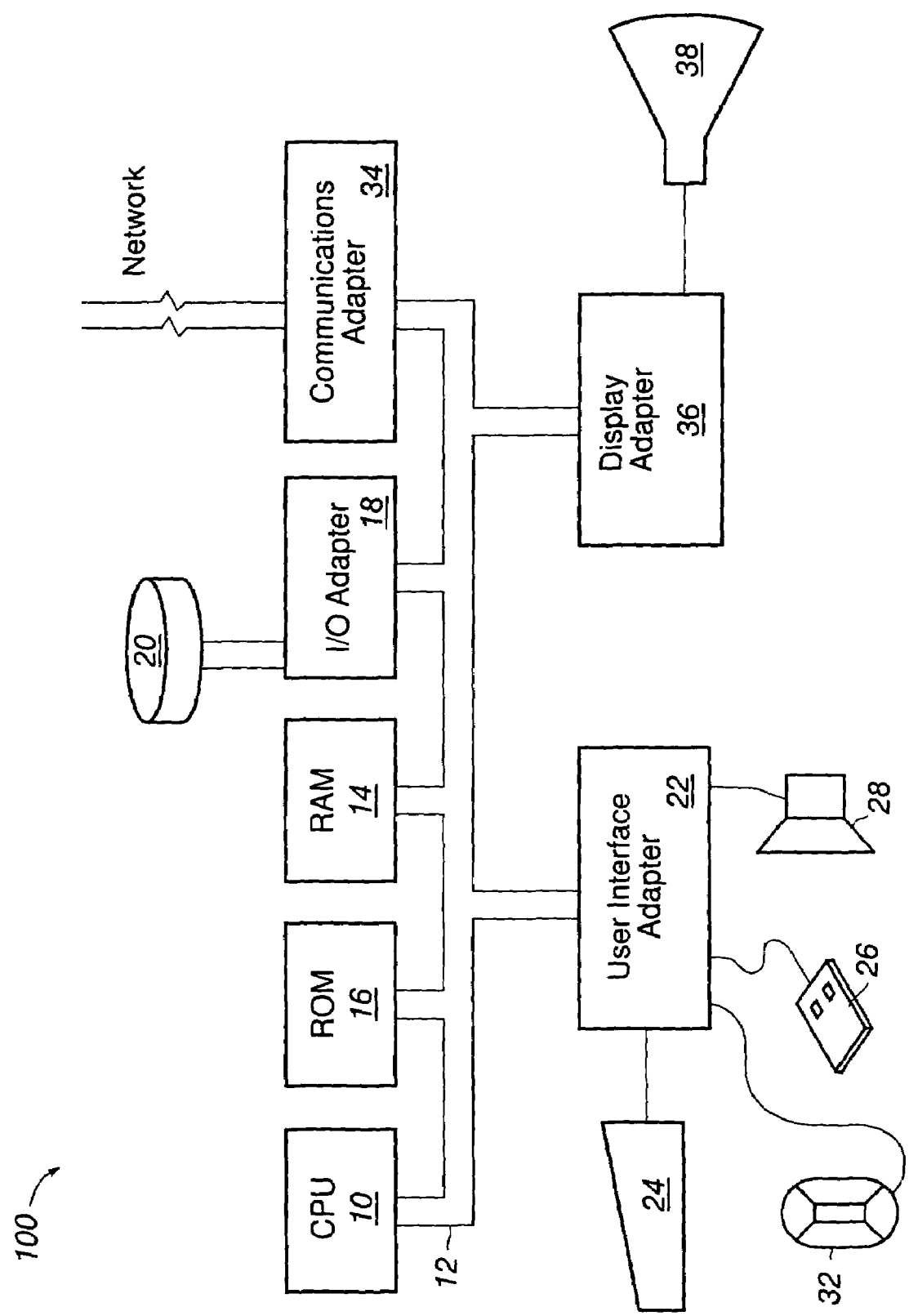
FIG. 1 is a high level functional block diagram of a representative data processing system suitable for practicing the principles of the present invention.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Referring to FIG. 1 is a high level functional block diagram of a representative data processing system 100 suitable for practicing the principles of the present invention. Processing system 100, includes a central processing system (CPU) 10 operating in conjunction with a system bus 12. CPU 10 may be for example, a reduced instruction set computer (RISC), such as an IBM POWERPC™ Processor, or a complex instruction set computer (CISC). System bus 12 operates in accordance with a standard bus protocol, such as the ISA protocol, compatible with CPU 10.

CPU 10 operates in conjunction read-only memory (ROM) 16 and random access memory (RAM) 14. Among other things, ROM 16 supports the basic input output system (BIOS). RAM 14 includes for example, DRAM (Dynamic Random Access Memory) system memory and SRAM (Static Random Access Memory) external cache.

I/O Adapter 18 allows for an interconnection between the devices on system bus 12 and external peripherals, such as mass storage devices (e.g., a hard drive, floppy drive or CD/ROM drive), or a printer. A peripheral device 20 is for example, coupled to a peripheral control interface (PCI) bus, and I/O adapter 18 therefore may be for example PCI bus bridge.

User interface adapter 22 couples various user input devices, such as keyboard 24, mouse 26, touchpad 32 or speaker 28 to the processing devices on bus 12.

Display adapter 36 supports a display 38 which may be for example a cathode ray tube (CRT), liquid crystal display (LCD) or similar conventional display unit. Display adapter 36 may include among other things a conventional display controller and frame buffer memory.

System 100 can be selectively coupled to a computer or telecommunications network through communications adapter 34. Communications adapter 34 may include for example, a modem for connection to a telecommunications network and/or hardware and software for connecting to a computer network such as a local area network (LAN) or wide area network (WAN).

Figure 2A:
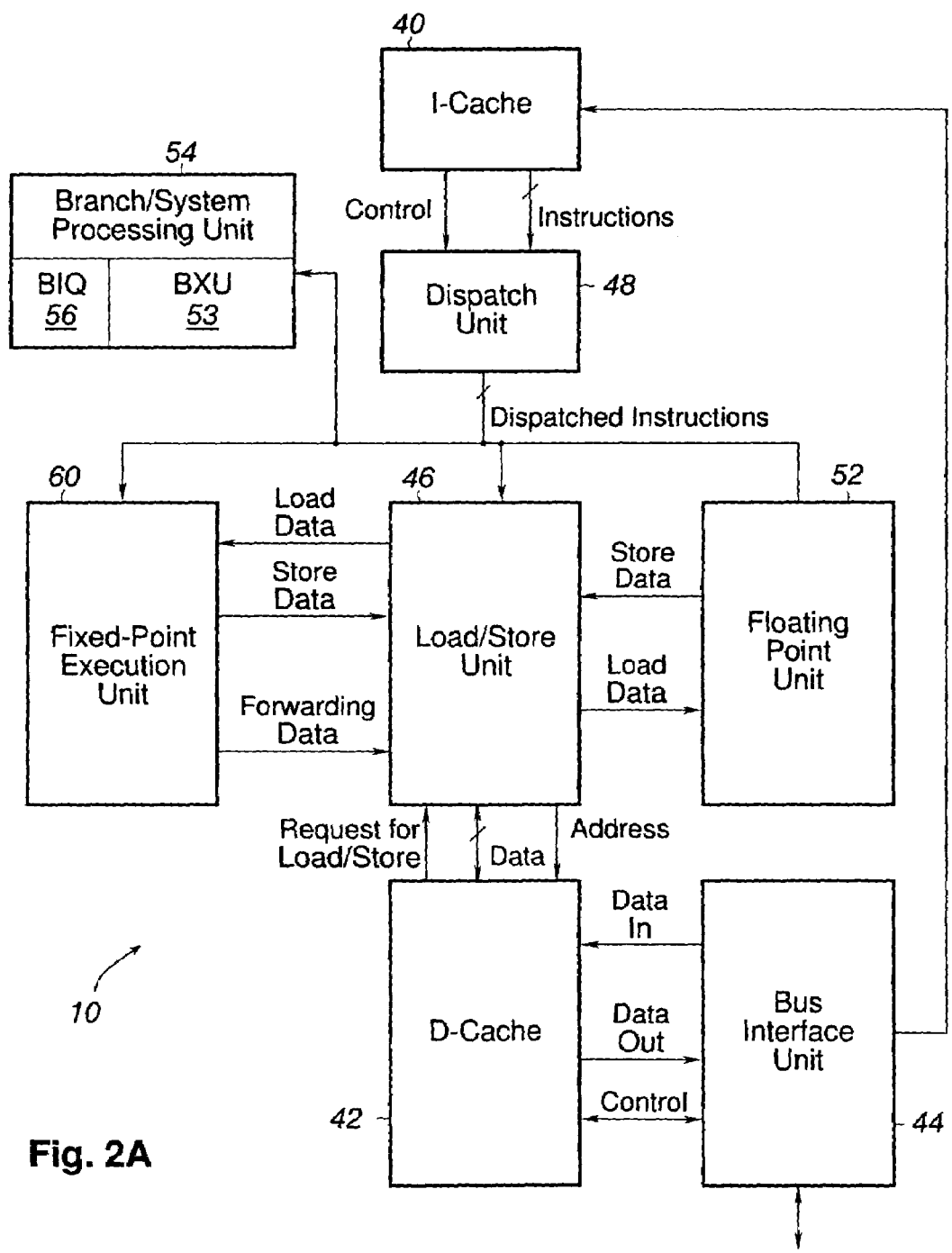
FIG. 2A is a high level functional block diagram of selected operational blocks within CPU.

FIG. 2 is a high level functional block diagram of selected operational blocks within CPU 10. In the illustrated embodiment, CPU 10 includes internal instruction cache (I-cache) 40 and data cache (D-cache) 42 which are accessible through bus 12 and bus interface unit 44 and load/store unit 46. In the depicted architecture, CPU 10 operates on data in response to instructions retrieved from I-cache 40 through instruction dispatch unit 48. In response to dispatch instructions, data retrieved from D-cache 42 by load/store unit 46 can be operated upon using either fixed point execution unit 50 or floating point execution unit 52. Instruction branching is controlled by branch/system processing unit 54. Branch processing unit 54 includes a branch information queue (BIQ) 56. BIQ 56 contains a plurality of entries 58. An entry 58 is shown in FIG. 2B, in which, entry 58 has a plurality of fields 58a–58e. Field 58a holds a branch instruction address, 58b contains a plurality of bits from a branch history table (BHT), field 58c holds a global history vector (GHV), field 58d incorporates a branch prediction value and field 58e contains a branch position value. Each of fields 58a–58e will be discussed further below, in conjunction with FIGS. 3A–8B.

Figure 3A:
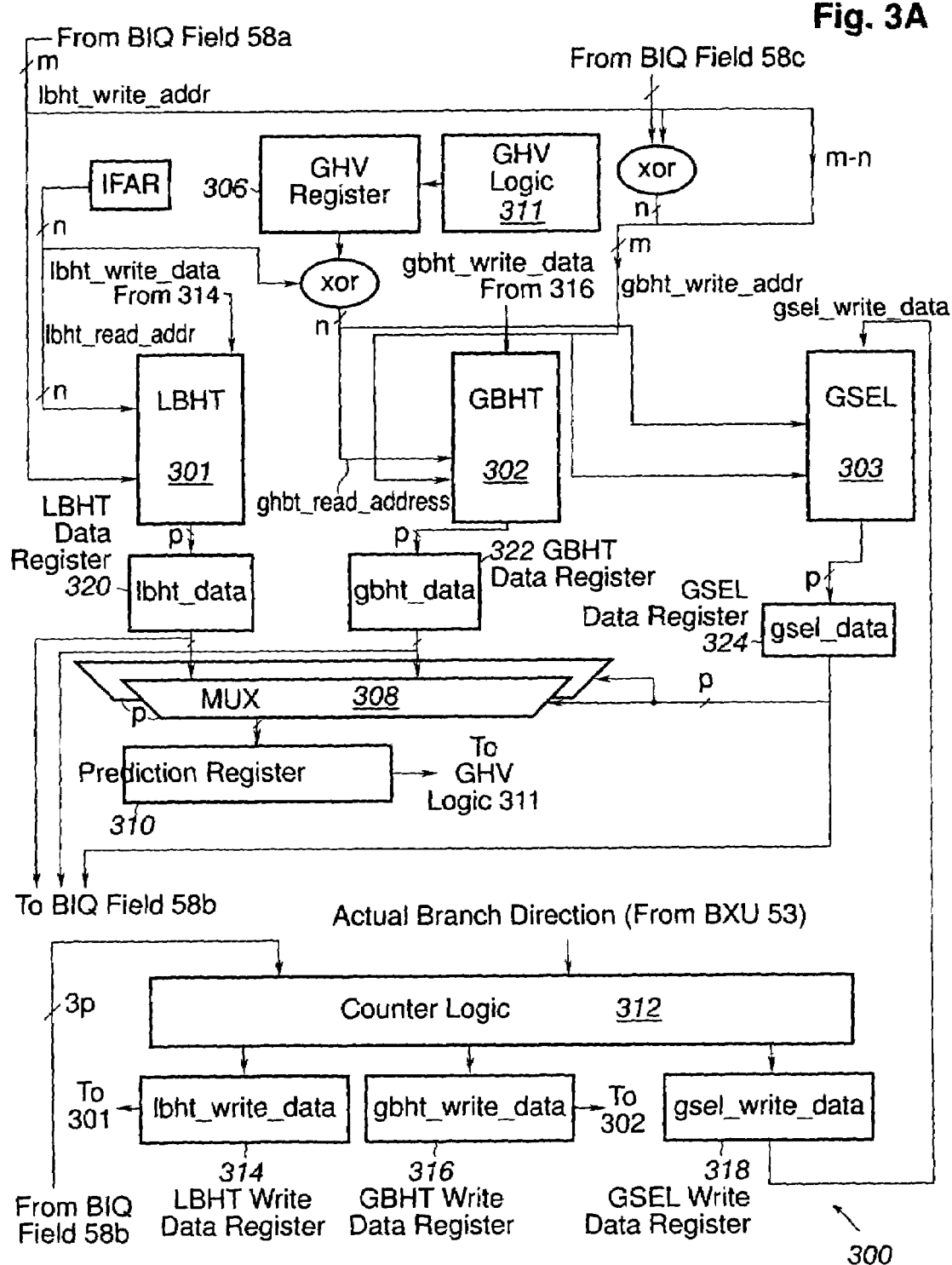
FIG. 3A is a high level functional block diagram of a branch prediction circuitry embodying the inventive principles.

FIG. 3A is a diagram illustrating a branch prediction apparatus 300 in accordance with a preferred embodiment of the present inventive concepts. Apparatus 300 may be incorporated in branch unit 54, FIG. 2. According to these concepts, three tables are used for branch prediction, namely, a local branch history table (LBHT) 301, a fetch-based branch history table (GBHT) 302 and a selector table (GSEL) 303. In the illustrated embodiment, each table 301–303 is composed of a preselected number, n, of entries each of which includes a number, p, of 1-bit counters. For purposes of the present discussion, when a given one of the counters in the local or fetch-based branch history tables is set to a Logic 1, that counter (entry) will be considered as being set to a taken branch prediction value. Consequently, in this configuration, a counter (entry) storing a Logic 0 will be considered as storing a branch not-taken-prediction bit. It should be noted however, that in alternate embodiments, the reverse logic may be used without deviating from the inventive concepts.

Local branch history table 301 is accessed for obtaining branch predictions using a pointer constituting n bits taken from the current cache line address, in instruction fetch address register (IFAR) 304 in a conventional fashion. The value of this pointer will be denoted "1bht_read_addr." Fetch-based branch history table 302 is accessed for obtaining branch predictions in a fashion in which n number of bits taken from the current cache line address are bitwise XORed with n number of bits from GHV register 306. The value of this pointer will be denoted "gbht_read_addr." The process for accessing the history tables will be described in detail in conjunction with FIG. 5.

In the preferred embodiment, the entries of GSEL 303 are accessed for obtaining predictions using the same pointer generated for the fetch-based branch history table, gbht_read_addr. The accessed entry from selector table 303 is then used by selection logic 308 to select either the local branch prediction values output from LBHT 301 or the fetch-based branch prediction value accessed from GBHT 302 for use as the final branch prediction value for determining if the branch is to be taken or not taken. Selection logic 308 may, in an embodiment of the present invention, be p multiplexers (MUXs), which output the p prediction values to prediction register 310. Note that a number q of the prediction values may be from LBHT 301 and a remaining number p–q may be from GBHT 302. Up to p instructions are fetched from memory, including internal memory, such as I-cache 40, FIG. 2, in one cycle of CPU 10. Thus, the number of predictions in an entry accommodates all of the instructions that are fetched in a single cycle, which may be referred to as a fetch group (FG). The numbers, p, of instructions in a fetch group may be eight in an embodiment of the present invention. In the illustrated embodiment, a Logic 0 accessed from selector table (GSEL) 303 selects the output from LBHT 301 while a Logic 1 selects the output from GBHT 302. Generally, selector table 303 tracks the performance of the local and fetch-based branch history tables for a given branch instruction. The branch history table having the better prediction history for the given branch instruction is then used to perform the current branch prediction.

The GHV from which the gbht_read_addr is generated as described above tracks the history of branch instructions as they are fetched and executed. Thus, as branches are executed and resolved, the GHV is updated. GHV logic 311 updates the GHV and loads it into GHV register 306. GHV logic 311 is described in detail in FIG. 4.

Additionally, the entries in LBHT 301, GBHT 302 and GSEL 303 must also be updated in response to the execution of branch instructions. The entries are updated by providing information to the appropriate entry in LBHT 301, GBHT 302 and GSEL 303 for setting or resetting, as appropriate, the p one-bit counters in the corresponding entry, depending on the prediction and the resolution, or actual outcome, of the branch. The information sent to LBHT 301 may be referred to as "1bht_write_data", the update information provided to GBHT 302 may be referred to as "gbht_write_data", and the update information for GSEL 303 may be referred to "gsel_write_data." The values of 1bht_write_data, gbht_write_data and gsel_write_data are generated by counter logic 312 and loaded, respectively, into LBHT write data register 314, GBHT write data register 316 and GSEL write data register 318. Counter logic 312 generates the values of 1bht_write_data, gbht_write_data and gsel_write_data in response to an actual branch direction determined when the corresponding branch instruction executes, and the predictions, from BIQ field 58b in the entry 57 corresponding to the resolved branch instruction. The methodology for generating the values of 1bht_write_data, gbht_write_data and gsel_write_data will be described in detail in conjunction with FIG. 5.

The corresponding entry in the respective one of LBHT 301, GBHT 302 and GSEL 303 is accessed using an address generated from the branch address, field 58a, in the corresponding entry 58 in BIQ 56. The address into LBHT 301, which may be referred to as "1bht_write_addr," constitutes the m-bit branch address in field 58a. A number, n, of bits of 1bht_write_addr are used to select the LBHT entry and the remaining, m-n, bits index the counters in the selected entry. Thus, $2^{(m-n)}=p$. Note that the m-bit branch address may be a portion of the full address of a branch instruction. The address for accessing GBHT 302 and GSEL 303, which may be referred to as "gbht_write_addr," is generated by XOR-ing n bits of the branch address from BIQ field 58a with the GHV value in BIQ field 58c corresponding to the branch instruction for which the history table entries are being updated. The resulting n bit value is concatenated with the remaining m-n bits of the branch address in field 58a to form the m-bit value of gbht_write_addr. The n-bit portion addresses the entry of the GBHT and the (m-n)-bit portion indexes the counters in the entry. In an embodiment of the present invention m•may be fourteen and n may be eleven. The methodology for addressing LBHT 301, GBHT 302 and GSEL 303, and updating the entries therein will be further described in conjunction with FIGS. 6 and 7.

Figure 4:
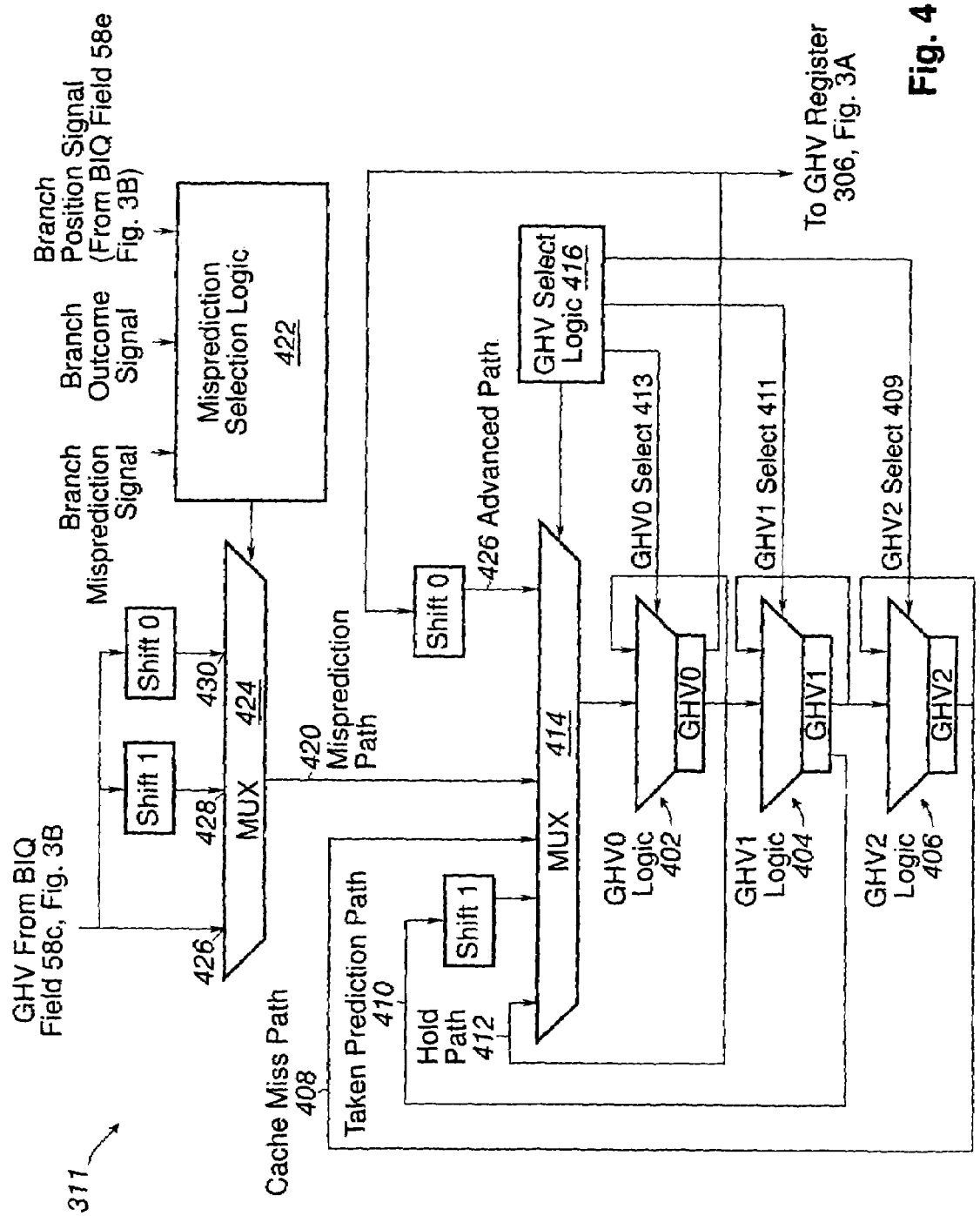
FIG. 4 illustrates in partial schematic form another portion of the branch prediction circuitry of FIG. 3A.

Refer now to FIG. 4 illustrating GHV logic 311 in further detail. The current value of GHV, which is loaded into GHV register 306, FIG. 3A, is provided from GHV0 logic 402. GHV0 logic 402 may be a register having a two-way multiplexer input. A first input to the multiplexer portion is coupled to an output of multiplexer (MUX) 414. Multiplexer 414 selects for outputting a GHV value from one of several paths that are rendered active in response to an event, cache miss, branch misprediction, pipeline hold, etc. that may modify the value of one GHV. Each of these paths and the operation of GHV logic 311 will be described in detail below.

Depending on the outcome of speculatively fetched instructions a prior state of the GHV may need to be recovered. That is, the GHV may need to be "backed up" to a previous state. GHV1 logic 404 and GHV2 logic 406 operate to hold the GHV2 for one and two prior processor cycles, respectively. GHV1 logic 404 and GHV2 logic 406 may also be a register having a two-way multiplexer input. In each of GHV0 logic 402, GHV1 logic 404 and GHV2 logic 406 the register output is fed back to an input of the multiplexer portion. A second input of GHV1 logic 404 is fed from the register output of GHV0 logic 402. Similarly, a second input of the multiplexer portion of GHV1 logic 406 is coupled to the output of GHV1 logic 404. In the embodiment of GHV logic 311 illustrated in FIG. 4, it is assumed that it takes two processor cycles to scan through a fetch group and determine if any branch in the fetch group has been predicted taken, and if so to determine the target address. It has also been assumed that it takes three cycles to determine if there is a cache miss. If there are more cycles to determine either a taken prediction, or a cache miss, additional GHVx logic stages denoted generically by GHVx, may be incorporated, as would be recognized by an artisan of ordinary skill in the art with taken-prediction path 408 and cache miss path 410 tapped off the corresponding GHV$_x$ logic stage.

As discussed above, the first input to GHV0 logic 402 is provided by an output MUX 414. MUX 414 is a five-way multiplexer, the input of which provides a value of the GHV in accordance with each of a set of actions that may cause the GHV to be modified. MUX 414 selects for the signal on one of the five inputs in response to GHV select logic 416. In an embodiment of the present invention GHV logic 311 may be provided with a two-phase clock signal (not shown in FIG. 4 for simplicity). Select logic 416 renders selects 409, 411, 413 active on a first predetermined phase of the two-phase clock and the register portions of GHV0 logic 402, GHV1 logic 404 and GHV2 logic 406 latch data on a second predetermined phase of the two-phase clock. The logic states associated with each of the inputs, denoted cache miss path 408, taken-prediction path 410, hold path 412, misprediction path 420 and advance path 426 will now be described. The operation of GHV logic 311 in rendering each of the inputs active will be described in detail in conjunction with FIGS. 8A and 8B where each of the inputs corresponds to a sequence of steps ("paths") within the methodology of FIGS. 8A and 8B.

Hold path 412 is active if the processor holds the instruction pipeline. Processors, such as CPU 11 in FIG. 1, may hold a pipeline if, for example, an instruction issue queue in an execution unit is full. In response, GHV select logic 416 selects for outputting the signal on hold path 412, which is provided by the output of GHV0 logic 402. Likewise, GHV0 select 413 assumes the logic state for selecting the feedback input from the output of GHV0 logic 402.

GHV select logic 416 selects taken-prediction path 410 as the active path if a branch in the fetch group is predicted taken. When taken-prediction path 410 is active, the value of the GHV output by GHV1 logic 404 is left shifted with the value "1" shifted into the least significant bit (LSB). GHV0 select 413 assumes a logic state selecting for the input to GHV0 logic 402 coupled to the output of MUX 414. Similarly, GHV1 select 411 and GHV2 select 409 assume the logic states for selecting the inputs to the respective one of GHV1 logic 404 and GHV2 logic 406 coupled to the output of GHV logic 402 and the output of GHV1 logic 404.

In the event of a cache miss, cache miss path 408 becomes active in response to GHV select logic 416. GHV2 select 409 assumes the logic state for selecting the feedback input into GHV2 logic 406, and each of GHV0 select 413 and GHV1 select 411 assume the logic state for selecting the input of GHV0 logic 402 coupled to MUX 414 and the input of GHV1 logic 404 coupled to the output of GHV logic 402, respectively.

If, on resolution, a branch is mispredicted, misprediction path 420 becomes the active path for MUX 414. Each of GHV0 select 413, GHV1 select 411 and GHV2 select 409 assumes the logic state for selecting input coupling each of logic 402, 404 and 406 to the output of its preceding one of MUX 414, logic 402 and logic 404, such that the value of the GHV on misprediction path 420 is loaded into the register portion of each of GHV0 logic 402, GHV1 logic 404, and GHV2 logic 406.

The value of the GHV on misprediction path 420 depends on the resolution of the branch, and the position of the mispredicted branch instruction in the fetch group. Misprediction selection logic 422 selects for one of three inputs in three-way MUX 424. If the actual outcome is resolved as not taken, and the resolved branch is not the last instruction in the fetch group, the value of the GHV in BIQ field 58c, FIG. 3B is selected. If, however, the resolved branch is the last instruction in the corresponding fetch group, then the GHV from BIQ field 58c is left shifted with "0" entered in the LSB thereof. If the mispredicted branch was resolved as taken, MUX 424 selects for the value of the GHV in BIQ field 58c left shifted with "1" loaded in the LSB.

If there is no instruction fetch redirection from one or more branch instructions in the fetch group, or a cache miss, or from an instruction pipeline hold, then the instruction pipeline can advance to the next sequential address from the last instruction in the current fetch group. Advance path 426 is then active, and the current GHV is left shifted with "0" loaded in the LSB. GHV1 select 411 selects for the input in GHV1 logic 404 coupled to the output of GHV logic 402 and GHV2 select 409 selects for the input in GHV2 logic 406 coupled to the output of GHV1 logic 404. Likewise, GHV0 select 413 selects for the output of MUX 414.

Figure 5:
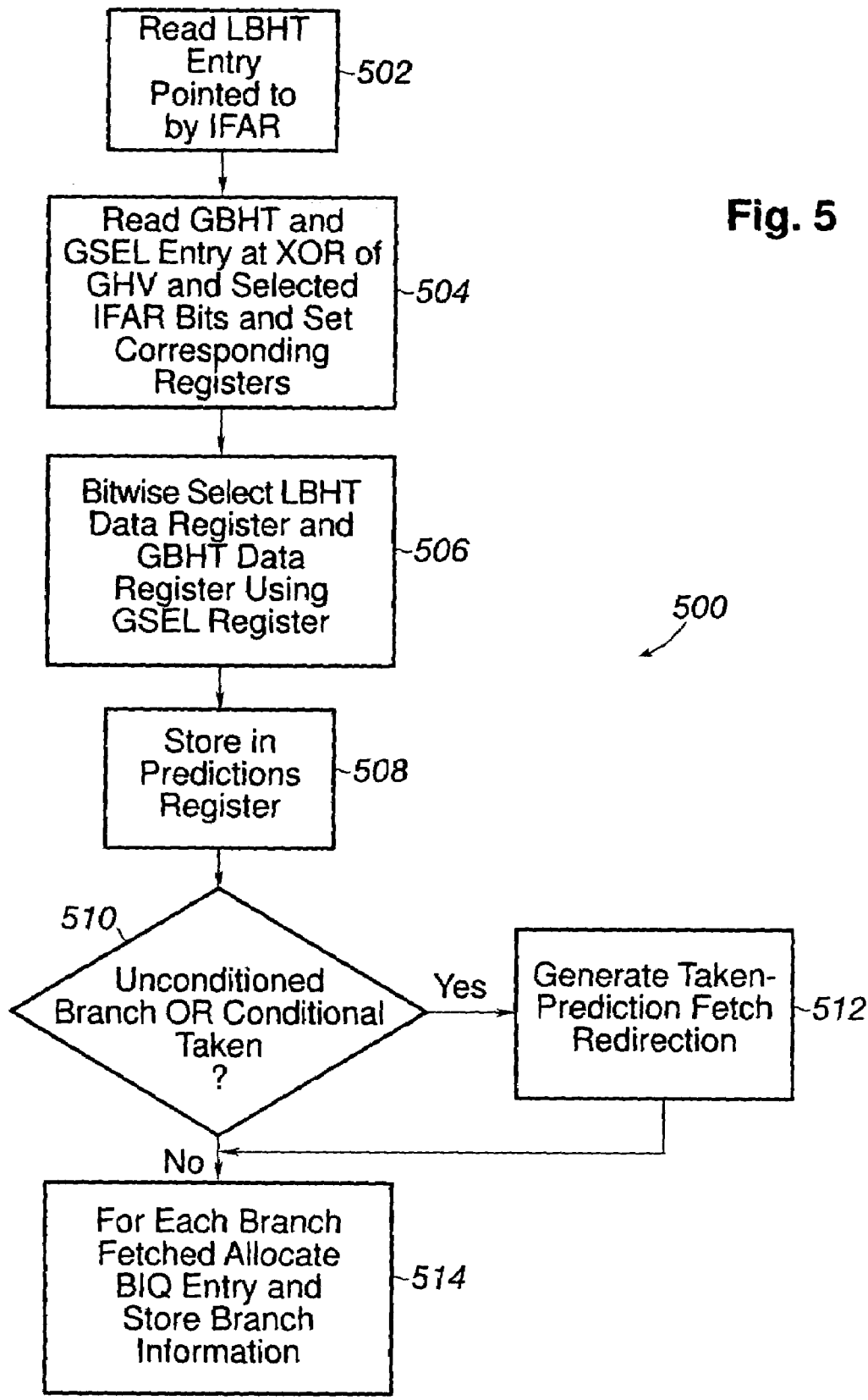
FIG. 5 illustrates in flowchart form, a methodology for accessing the local and fetch-based branch history tables of FIG. 3A in accordance with the principles of the present invention, FIG. 6 (including partial views FIG. 6A and FIG. 6B) is a flow diagram illustrating a first method of updating the local and fetch-based branch history and selector tables of FIG. 3A.

The methodologies for generating branch predictions and updating the branch history tables and updating the GHV in accordance with the principles of the present invention may now be described. These methodologies may be executed by the branch prediction circuitry 300 in FIG. 3A. Refer now to FIG. 5, illustrating methodology 500 for generating branch predictions and storing branch information in the BIQ. In step 502, the entry in the LBHT pointed to by the value in the IFAR is read. The addressing of entries in LBHT via the IFAR has been discussed hereinabove in conjunction with FIG. 3A. In step 504, the GBHT and GSEL entries pointed to by the gbht_read_addr, as also described hereinabove in conjunction with FIG. 3A, is read. In step 506, the LBHT data is selected in response to the value in the corresponding entry in GSEL 303. The branch history table data, either the LBHT data or the GBHT data, may be selected via MUX 308 in response to the GSEL data. For example, as described above, in an embodiment of the present invention, a Logic 0 in the corresponding entry in GSEL 303 selects the output from LBHT 301 and a Logic 1 selects the output from GBHT 302. In an embodiment of the present invention in accordance with apparatus 300 of FIG. 3A, the LBHT data, the GBHT data, and the GSEL data may be held in respective data registers, for example, LBHT data register 320, GBHT data register 322, and GSEL data register 324. The selected data is stored in a prediction register, such as prediction register 310, in step 508.

If, in step 510, it is determined that the fetch group contains an unconditional branch, or in response to the predictions in step 508, a conditional branch is predicted taken, then in step 512 a taken-prediction fetch redirection is generated. This redirection may signal GHV select logic 416, FIG. 4, to select taken-prediction path 410 as the active path. Then, in step 514, for each branch in the fetch group, a BIQ entry is allocated and the branch information is stored in the corresponding fields, such as fields 58a–58e of entry 58, FIG. 2B.

Figure 6A:
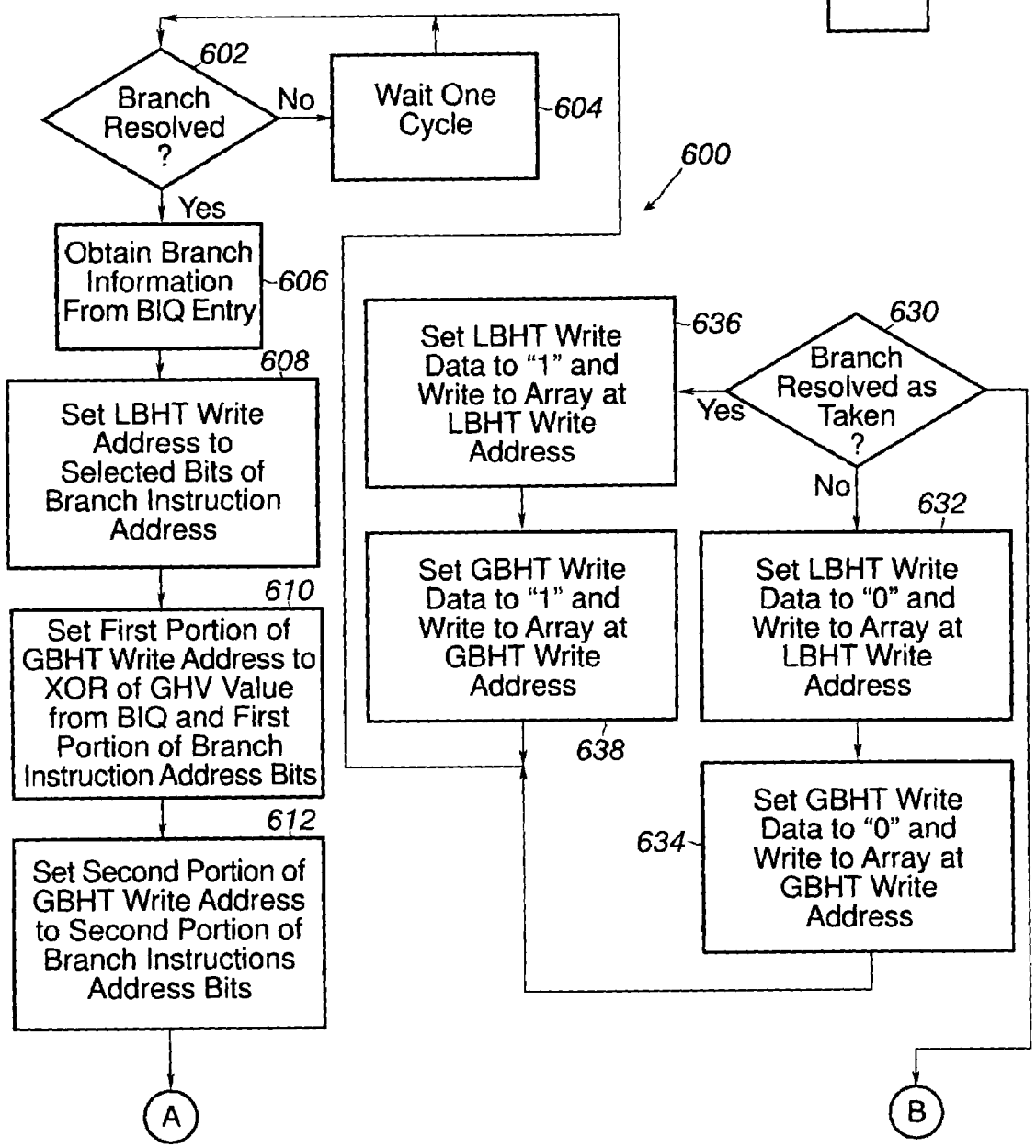
Figure 6B:
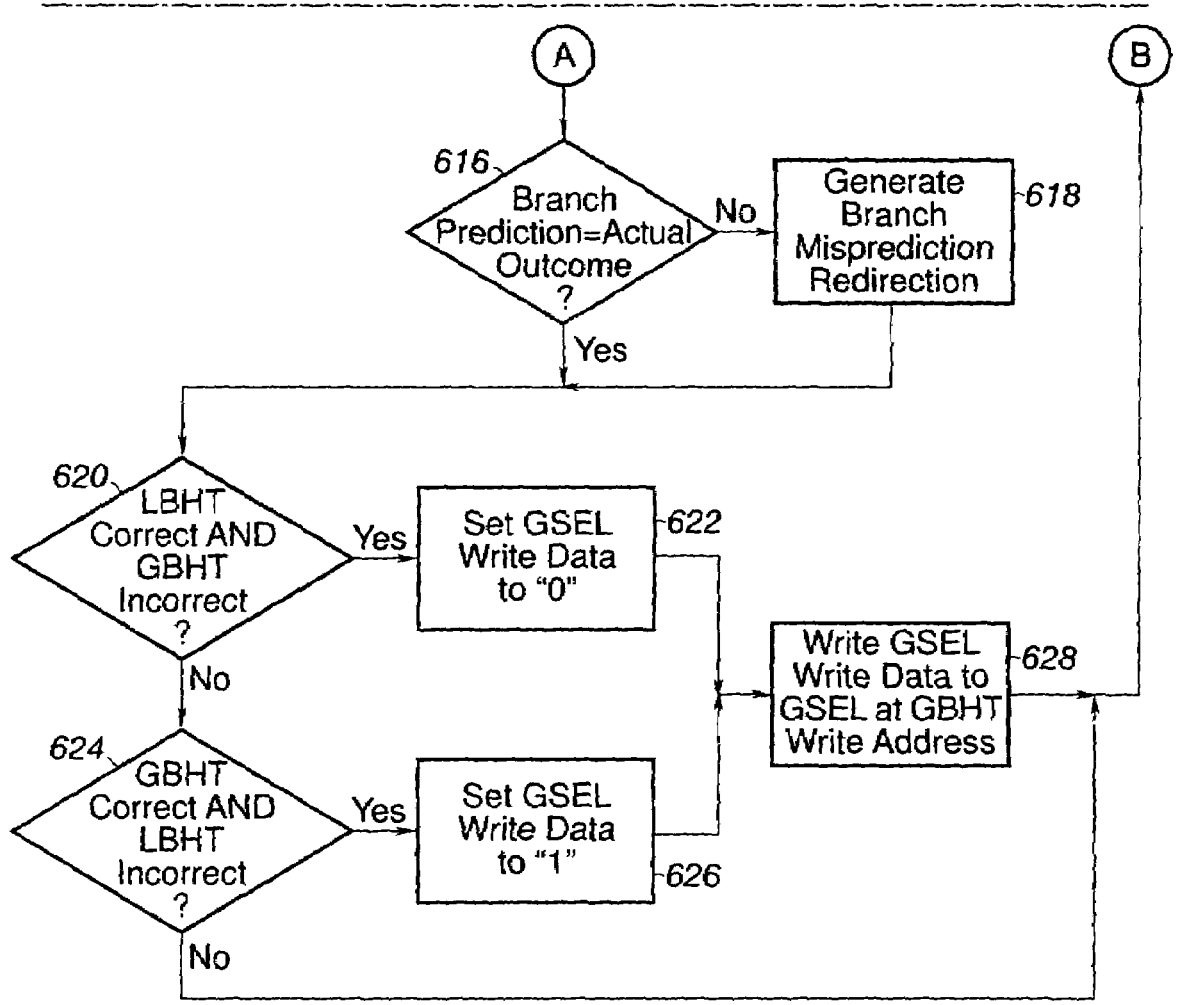

Referring now to FIG. 6, there is illustrated therein methodology 600 for writing to the branch history table entries in accordance with an embodiment of the present invention. In step 602, it is determined if the branch instruction has been resolved in a current processor cycle. If not, methodology 600 waits one cycle, in step 604. Otherwise, if a branch has been resolved, in step 606 the branch information is obtained from the corresponding BIQ entry. In step 608, the value of lbht_write_addr is set to m bits of the branch address from the BIQ, for example from BIQ field 58a, in a BIQ entry in accordance with entry 58 of FIG. 2B. Similarly, in step 610, the value of gbht_write_addr is set to the XOR of n bits of the branch address and the value of the n-bit GHV from the BIQ entry, for example from field 58c of BIQ entry 58 in FIG. 2B. The remaining portion of gbht_write_addr constituting the remaining m-n bits of the m-bit branch address from the corresponding BIQ entry field, as previously described hereinabove in conjunction with FIG. 3A, is set in step 612. Recall that in an embodiment of the present invention, m may be fourteen and n may be eleven.

In step 616, it is determined if the branch prediction is the actual outcome. If not, in step 618 a branch misprediction redirect is generated. In response thereto, in an embodiment of the present invention in accordance with apparatus 300 in FIG. 3A, GHV select logic 416, FIG. 4, and GHV logic 311 may select misprediction path 420 as the active path. Additionally, in step 618 a branch misprediction signal provided to misprediction selection logic 422, FIG. 4, is asserted. If, however, in step 616 the prediction and actual outcome are the same, step 618 is bypassed.

In step 620, it is determined if the prediction from the LBHT is correct, and the prediction from the GBHT incorrect. If so, in step 622, the value of gsel_write_data is set to "0." Otherwise, in step 620, the "No" branch is followed and in step 624 it is determined if the GBHT is correct and the LBHT prediction incorrect. If so, in step 626, the value of gsel_write_data is set to "1." In an embodiment of the present invention, in accordance with methodology 600 in which, in step 622 the value of gsel_write_data is set to "0" and the value, in step 626, of gsel_write_data is set to "1,"

MUXs 308 select data from LBHT data register 320 in response to a logic state of "0" and select for data from GBHT data register 322 in response to a logic state of "1." However, an artisan of ordinary skill in the art would recognize that a complementary embodiment MUXs 308 may be used in which embodiment a value of "1" would be written in step 622, and a value of "0" would be written in step 626 of methodology 600. It would be further understood by an artisan of ordinary skill in the art that such an alternative embodiment would be in the spirit and scope of the present invention.

After setting the value of gsel_write_data in either step 622 or 626, the value of gsel_write_data is written to the entry in GSEL 303 pointed to by the value of gbht_write_addr, step 628. If, however, in step 624, the GBHT prediction is incorrect or the LBHT prediction is correct, that is, the LBHT and GBHT predictions were both correct or both incorrect, wherein step 620 takes the "No" branch, steps 622, 626 and 628 are bypassed, and the corresponding entry in GSEL 303 is unchanged.

Next, the entries in the LBHT and GBHT are updated. In step 630, it is determined if the branch resolved as taken. If not, 1bht_write_data is set to "0" and written to the LBHT at the entry pointed to by 1bht_write_addr, step 632. Similarly, the value of gbht_write_data is set to "0" and written to the GBHT entry pointed to by gbht_write_addr, step 634. Methodology 600 then returns to step 602. If, however, in step 630, if the branch was resolved as taken, then, in step 636, the value of 1bht_data is set to "1", and written to the LBHT at the address pointed to by 1bht_write addr. Likewise, in step 638, the value of gbht_write_data is set to "1" and written to the GBHT at the entry pointed to by gbht_write_addr; and methodology 600 returns to step 602. It would be understood by an artisan of ordinary skill that a complementary embodiment of the present invention may be implemented in which complementary values of 1bht_write_data are used in steps 632, 634 and 636, 638, respectively, and such an embodiment would be within the spirit and scope of the present invention.

Figure 7A:
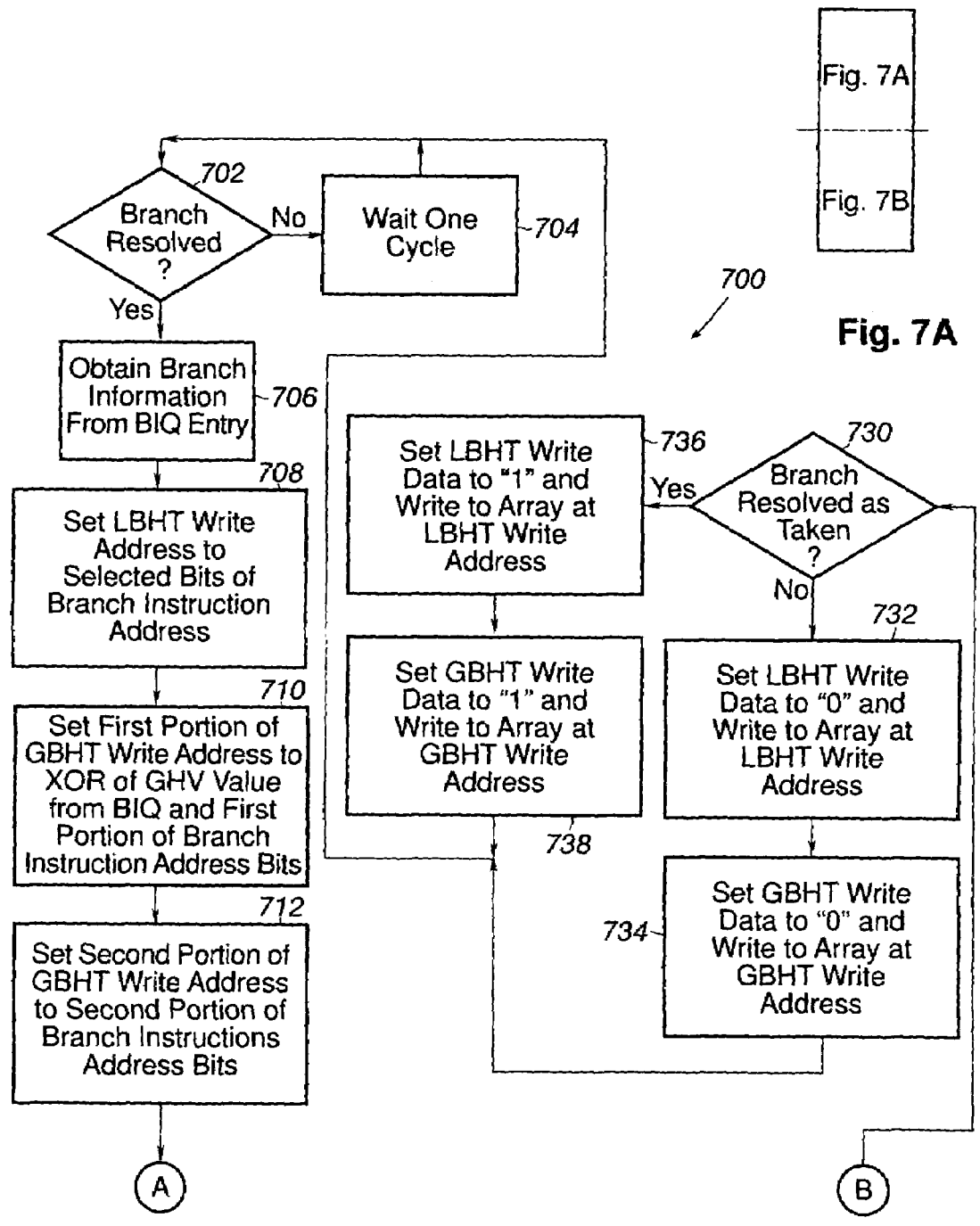
FIG. 7 (including partial views FIG. 7A and FIG. 7B) is a flow diagram illustrating a second method of updating the local and fetch-based branch history and selector tables of FIG. 3A.
Figure 7B:
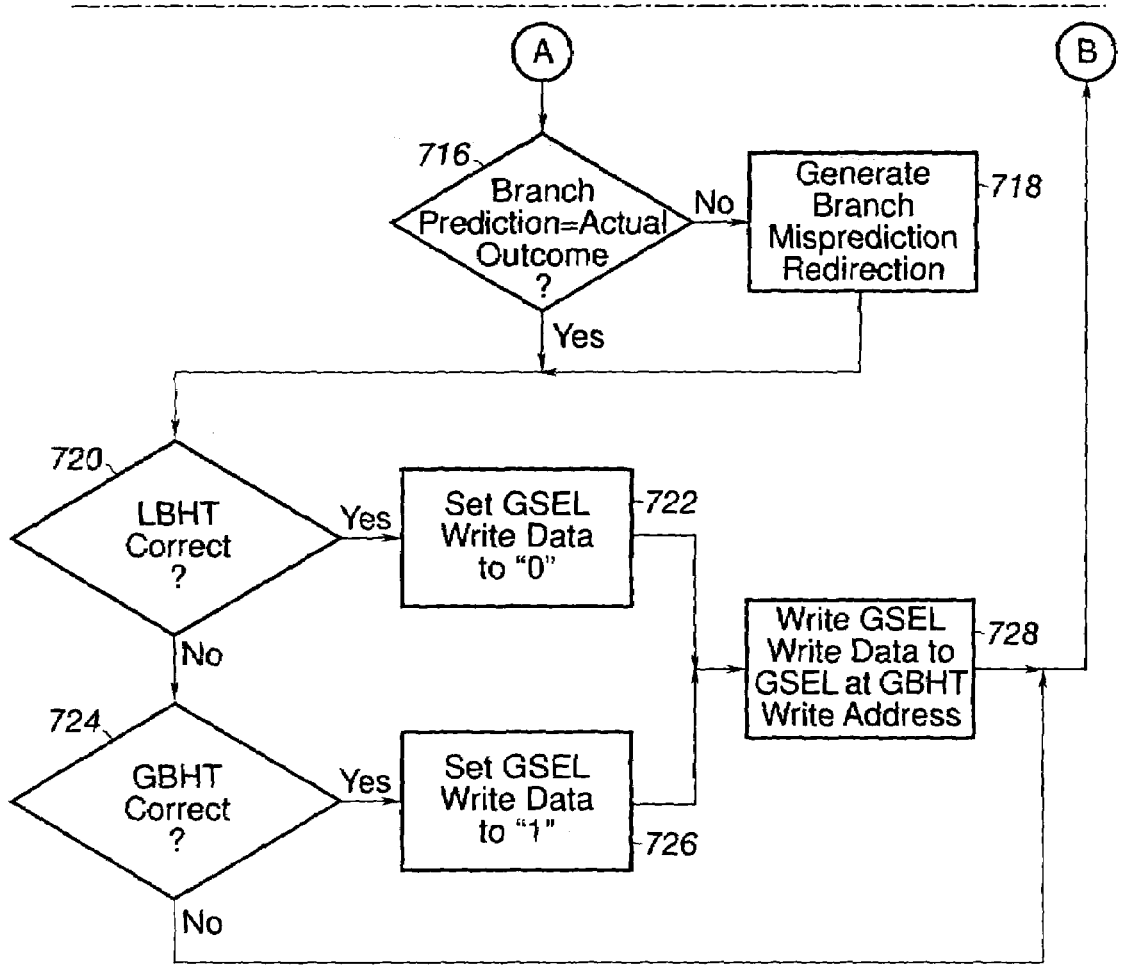

Refer now to FIG. 7 illustrating methodology 700 for updating the branch history table entries in accordance with an alternative embodiment of the present invention. In step 702, it is determined if the branch instruction has been resolved in the current processor cycle. If not, methodology 700 waits one cycle, in step 704. Otherwise, if a branch has been resolved, in step 706 the branch information is obtained from the corresponding BIQ entry. In step 708, the value of 1bht_write_addr is set to m bits of the branch address from the BIQ, for example from BIQ field 58a, in a BIQ entry in accordance with entry 58 of FIG. 2B. Similarly, in step 710, the value of gbht_write_addr is set to the XOR of n bits of the branch address and the value of the n-bit GHV from the BIQ entry for example from field 58c of BIQ entry 58 in FIG. 2B. The remaining portion of gbht_write_addr constituting the remaining m-n bits of the m-bit branch address from the corresponding BIQ entry field, as previously described hereinabove in conjunction with FIG. 3A, is set in step 712. Recall that in an embodiment of the present invention, m may be fourteen and n may be eleven.

In step 716, it is determined if the branch prediction is the actual outcome. If not, in step 718 a branch misprediction redirect is generated. In response, in an embodiment of the present invention in accordance with mechanism 300 in FIG. 3A, GHV select logic 416, FIG. 4, and GHV logic 311 may select misprediction path 420 as the active path. Additionally, in step 718 a branch misprediction signal provided misprediction selection logic 422, FIG. 4, is asserted. If, however, in step 716 the prediction and actual outcome are the same, step 718 is bypassed.

In step 720, it is determined if the prediction from the LBHT prediction is correct. If so, in step 722, the value of gsel_write_data is set to "0." Otherwise, in step 720, the "No" branch is followed and in step 724 it is determined if the GBHT prediction is correct. If so, in step 726, the value of gsel_write_data is set to "1." In an embodiment of the present invention, in accordance with methodology 700 in which, in step 722 the value of gsel_write_data is set to "0" and the value, in step 726, of gsel_write_data is set to "1," MUXs 308 select data from LBHT data register 320 in response to a logic state of "0" and select for data from GBHT data register 322 in response to a logic state of "1." However, an artisan of ordinary skill in the art would recognize that a complementary embodiment MUXs 308 may be used in which embodiment a value of "1" would be written in step 722, and a value of "0" would be written in step 726 of methodology 700. It would be further understood by an artisan of ordinary skill in the art that such an alternative embodiment would be in the spirit and scope of the present invention. After setting the value of gsel_write_data in either step 722 or 726, the value of gsel_write_data is written to the entry in GSEL 303 pointed to by the value of gbht_write_addr, step 728. If, however, in step 724, the GBHT prediction is incorrect or the LBHT prediction is correct, that is, both the LBHT and GBHT predictions were incorrect by virtue of step 720, the corresponding entry in GSEL 303 is unchanged, and step 722, 726 and 728 are bypassed.

Next, the entries in the LBHT and GBHT are updated. In step 730, it is determined if the branch resolved as taken. If not, 1bht_write_data is set to "0" and written to the LBHT at the entry pointed to by 1bht_write_addr, step 732. Similarly, the value of gbht write_data is set to "0" and written to the GBHT entry pointed to by gbht_write_addr, step 734. Methodology 700 then returns to step 702. If, however, in step 730, if the branch was resolved as taken, then, in step 736, the value of 1bht_write_data is set to "1" and written to the LBHT at the address pointed to by 1bht_write_addr. Likewise, in step 738, the value of gbht_write_data is set to "1" and written to the GBHT at the entry pointed to by gbht_write_addr, and methodology 700 returns to step 702. Recall, however, as discussed in conjunction with FIG. 6, complementary values of 1bht_write_data and gbht_write_data may be used in steps 732, 736, and 734 and 738, respectively.

Additional alternative embodiments of methodology 600 may be implemented in which one GSEL, such as GSEL 303, FIG. 3A, may be updated when both the LBHT and GBHT are correct or when neither is correct. These alternative embodiments are summarized in Table 1, wherein case 1 and case 2 correspond to steps 620–628 and steps 720–728 in FIGS. 6 and 7, respectively. An artisan of ordinary skill would understand the adaptations of steps 620–628 or, alternatively, steps 720–728 to implement the alternative embodiments in cases 3–9, Table 1, and would recognize that these alternative embodiments are within the spirit and scope of the present invention.

TABLE 1

| | LBHT prediction correct | GBHT prediction correct | GSEL update |
|---|---|---|---|
| 1. | Yes | Yes | No change |
| | No | No | No change |

TABLE 1-continued

| LBHT prediction correct | GBHT prediction correct | GSEL update |
| --- | --- | --- |
| 2. Yes | Yes | write 0 |
| No | No | No change |
| 3. Yes | Yes | No change |
| No | No | write 0 |
| 4. Yes | Yes | No change |
| No | No | write 1 |
| 5. Yes | Yes | write 0 |
| No | No | write 0 |
| 6. Yes | Yes | write 0 |
| No | No | write 1 |
| 7. Yes | Yes | write 1 |
| No | No | No change |
| 8. Yes | Yes | write 1 |
| No | No | write 0 |
| 9. Yes | Yes | write 1 |
| No | No | write 1 |

Figure 8B:
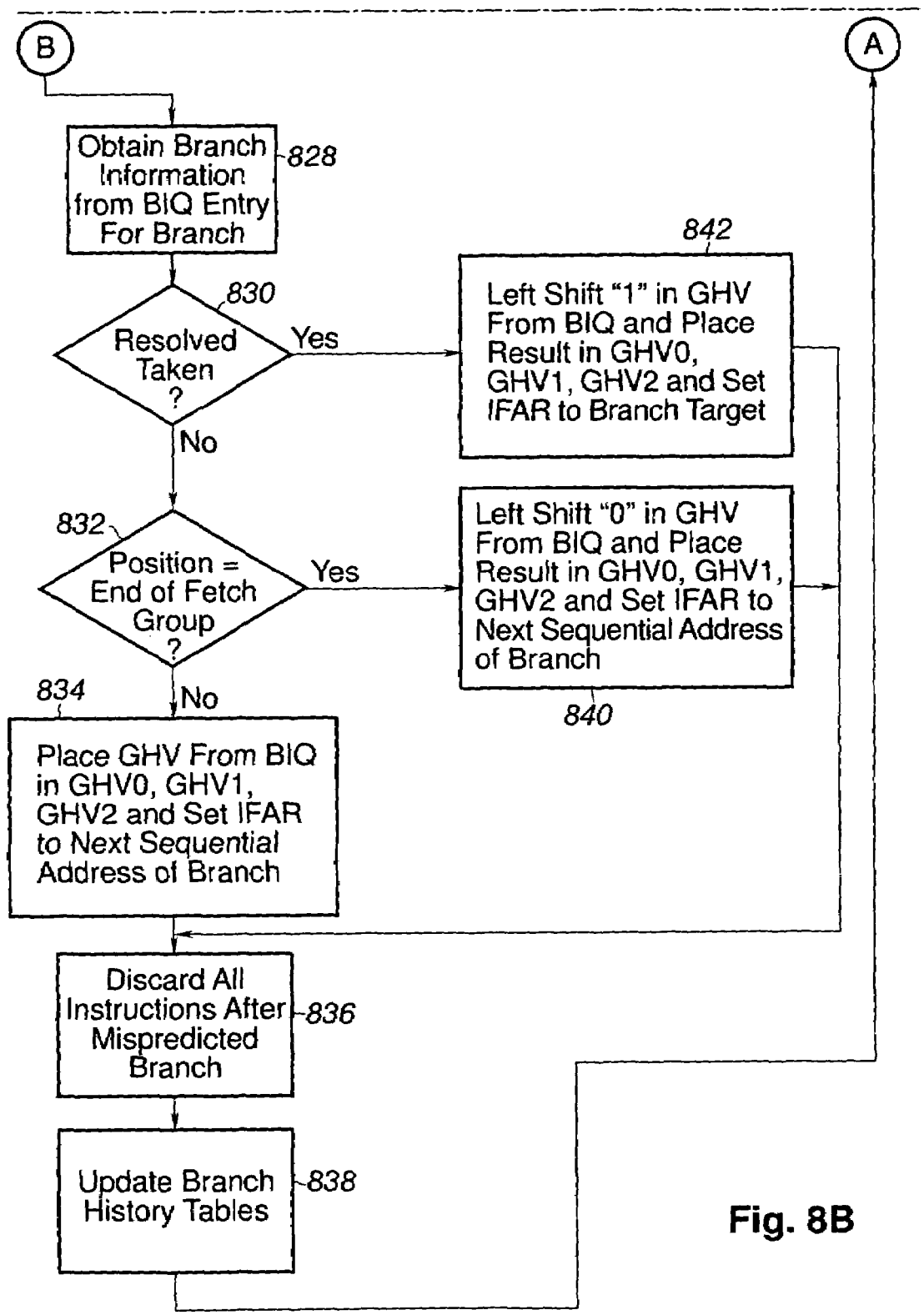

The values of the GHV may be updated in accordance with methodology 800, illustrated in FIGS. 8A and 8B. In step 802, the IFAR is set to the address of the current instruction, and in step 804 the next group of instructions is fetched.

It is then determined, in step 806, whether an instruction fetch redirection has been generated. An instruction fetch redirection may be generated by the processor asserting a pipeline hold, as previously discussed hereinabove in conjunction with FIG. 4, or a cache miss. Additionally, a branch misprediction may generate an instruction fetch redirection as, for example, in step 618 of methodology 600 in FIG. 6.

If, in step 806, an instruction fetch redirection has not occurred, the IFAR is set to the next sequential instruction, step 808, and in step 810 the value in the register portion of GHV1 logic 402, FIG. 4, denoted GHV1, is copied to the register portion of GHV2 logic 406 and the value, denoted GHV0, in the register portion of GHV0 logic 402 is loaded in the register portion of GHV0 logic 404 to become a new value of GHV1. Additionally, the value of GHV0 in the register portion of GHV0 logic 402 is left-shifted and the value "0" loaded in the LSB thereof, and latched into the register portion of GHV0 logic 402. In an embodiment of the present invention, with GHV logic 311 in accordance with FIG. 4, step 810 may be performed using GHV select logic 416, whereby step 810 effects advanced path 426. Methodology 800 then returns to step 804.

If, however, in step 806, an instruction fetch redirection has been received, it is determined if the redirection is a branch-taken prediction. In an embodiment of the present invention in accordance with methodology 500, FIG. 5, the branch-taken fetch redirection may be generated as described in step 512, FIG. 5. If, in step 812 the fetch redirection is a taken prediction, a "1" is left-shifted into the value obtained from the register portion of GHV1 logic 404, denoted GHV1, and copied into the register portions of GHV0 logic 402, GHV1 logic 404 and GHV2 logic 406. In an embodiment of the present invention in accordance with the GHV logic 311 of FIG. 4, step 814 may be effected by GHV select logic 416 rendering taken-prediction path 410 active. Also in step 814, the IFAR is set to the branch target address of the branch predicted taken. Methodology 800 then returns to step 804.

If, however, in step 812, a taken-prediction redirection has not been effected, in step 816, it is determined if a cache miss has occurred. If so, in step 818, the value, in the register portion of GHV2 logic 406, denoted GHV2, is loaded into the register portions of GHV0 logic 402 and GHV1 logic 404. In an embodiment of the present invention in accordance with the GHV logic of FIG. 4, step 820 may be performed by GHV select logic 416 effecting cache miss path 408 via MUX 414, and GHV0 select 413 selecting for the input of GHV logic 402 coupled to the output of MUX 414, GHV1 select 411 selecting for the input of GHV1 logic 404 coupled to the output of GHV0 logic 402 and GHV2 select 409 selecting for the feedback input of GHV2 logic 406. Then, in step 820, the IFAR is backed up by three fetch cycles. That is, a state of the IFAR is returned to the state of the IFAR three fetch cycles earlier than the current cycle. It is assumed, in the embodiment of the present invention in accordance with methodology 800, that it takes three fetch cycles to detect a cache miss. In a processor in which detection of a cache miss takes more than three cycles, then, in step 820, the IFAR will be backed up by the corresponding number of cycles. Additionally, additional stages of GHVx logic would be incorporated in GHV logic 310. FIG. 4, as discussed hereinabove. After the IFAR is backed up in step 820, methodology 800 loops until the instructions return from a lower level of a memory hierarchy or a fetch redirection is received, step 821. Thereafter, methodology continues to step 804.

If, however, in step 816 the instruction fetch redirection is not a cache miss, it is determined in step 822, if the redirection is a pipeline hold. If so, in step 824, the values of GHV0 in the register portion of GHV0 logic 402, GHV1 in the register portion of GHV1 logic 404, and GHV2 in the register portion of GHV2 logic 406 are held. In the embodiment of GHV logic 310 of FIG. 4, GHV select logic 416 effects the hold path 412 in performing step 824. Methodology 800 then returns to step 806.

If, in step 822, the redirection is not a pipeline hold, then the instruction fetch redirection, determined in step 806 is a branch misprediction, and methodology 800 proceeds to step 828, FIG. 5B. In step 828, the branch information from the BIQ entry for the mispredicted branch is obtained. In step 830, it is determined if the branch resolved as taken. If not, in step 832, it is then determined if the position of the mispredicted branch in the fetch group is at the end of the fetch group. If not, in step 834, the value of the GHV obtained from the BIQ in step 828 is loaded into the register portions of GHV0 logic 402, GHV1 logic 404, and GHV2 logic 406 as the value of, respectively, GHV0, GHV1, and GHV2. In an embodiment of GHV logic 310 in accordance with FIG. 4, step 834 may be performed by misprediction selection logic 422 selecting for input 426 of MUX 424, in response to a branch outcome signal and branch position signal. The branch position signal may be received from BXU field 58e, FIG. 3B in accordance with the branch entry 58 illustrated therein. The branch outcome signal may be received from BXU 53 in branch processing unit 54, FIG. 2A. The branch outcome signal may have a first predetermined value indicating that the branch resolved as taken and a second predetermined value indicating that the branch resolved as not taken. Also, in response to the misprediction, GHV select logic 416 selects for misprediction path 420 and GHV0 select 413, GHV1 select 411 and GHV2 select 409 select for the respective inputs of GHV0 logic 402, GHV1 logic 404 and GHV2 logic 406 coupled to the corresponding one of the output of MUX 414 and the outputs of GHV0 logic 402 and GHV1 logic 404.

Additionally in step 834, the IFAR is set to the next sequential address of the branch address received in step 828.

In step 836, all instructions after the mispredicted branch are discarded, and in step 838 the branch history tables are updated. Branch history tables may be updated, in step 838 in accordance with methodology 600, FIG. 6, or, in an alternative embodiment of the present invention, methodology 700, FIG. 7. Methodology 800 then returns to step 804, FIG. 8A.

Returning now to step 832, if the mispredicted branch is at the end of the fetch group then, step 832 proceeds by the "Yes" branch to step 840. In step 840, a "0" is left-shifted into the GHV received from the BIQ in step 828 and the result loaded into GHV0, GHV1, and GHV2. Step 840 may be performed in the embodiment of GHV logic 310 of FIG. 4 by misprediction selection logic 422 selecting for input 430 in MUX 424. Additionally, GHV select logic 416 selects from its prediction path 420, as previously described. Additionally, in step 840, the IFAR is set to the next sequential address of the branch address as received in step 828. Methodology 800 then proceeds to step 836, previously discussed.

Returning to step 830, if the mispredicted branch resolved taken, step 830 proceeds by the "Yes" branch to step 842. In step 842, a "1" is left-shifted into the GHV received from the BIQ in step 828, and the results loaded into GHV0, GHV1, and GHV2. Step 842 may be performed, in the embodiment of GHV logic 310 of FIG. 4 by misprediction selection logic 422 selecting for input 428 of MUX 434. Additionally, GHV select logic 416 selects from misprediction path 420 as previously discussed. Also, in step 842, the IFAR is set to the branch target address of the mispredicted branch instruction. Methodology 800 then proceeds to step 836 as previously described.

In this way, branch prediction based on a prediction history is implemented having a constant amount of processing. According to the principles of the present invention, one bit is shifted into the global history vector for each fetch group. The loading of a bit, "one" or a "zero," in the global history vector essentially captures the path the program has taken to reach the branch instruction being predicted, and thereby provides an indication of how the branch will behave (taken or not-taken).

The following example illustrates the branch prediction mechanism in accordance with the present invention. Consider a sequence of instructions, which may be written in PowerPC™ assembly language as:

| (1) | LB00 | addic | G0, G2, 0 | |
|---|---|---|---|---|
| (2) | LB01 | cmp | 00, 0, G0, G1 | |
| (3) | | bc | 0C, 02, <LB00> | /* Direction toggles; executes 63 times; */ |
| (4) | | nop | | /* Mispredicts first 5 times only */ |
| (5) | | nop | | |
| (6) | | nop | | |
| (7) | | nop | | |
| (8) | | nop | | |
| (9) | | addic | G0, G1, 0 | |
| (10) | | add | G4, G4, G1 | |
| (11) | | cmp | 00, 0, G4, G5 | |
| (12) | | bc | 04, 02, <LB01> | /* Loops 32 times; mispredicts twice */ |

(PowerPC™ is a trademark of International Business Machines Corp.) Although the code snippet above is written in PowerPC™ assembly, it would be understood by an artisan of ordinary skill in the art that the invention is not limited to the PowerPC™ processor, and, in particular, a similar sequence of operations could be written in an assembly language corresponding to other microprocessor systems. In the above, G0, G1, G2, G4, and G5 correspond to five general purpose registers. These are initialized with the exemplary values 0, 1, 2, 0, and 32, respectively. The operations performed by the above example include two branches, the instructions having the mnemonic "bc". The "nop" (no operation) instructions are introduced to pad out a fetch group corresponding to an embodiment of the present invention in which a fetch group includes eight instructions. If the first branch is not taken, then the next instruction executed is in second fetch group which starts with the ninth instruction above, that is, the second "addic" instruction.

The first instruction moves the value in the register G2 into the register G0. The second instruction, denoted by the mnemonic "cmp" compares the value in the register G0 with the value in the register G1. In response to the comparison of the contents of the register operands, the "cmp" instruction sets a bit in a selected field, in this case, field 0, in a condition register. If the content of register G0 is larger than the content of register G1, a first one of the plurality of bits in the selected field is set. If the contents are equal, a second one of the plurality of bits is set, and if the contents of register G1 exceed the contents of register G0, a third one of the plurality of bits in the selected field of the condition register is set. Instruction (3), the first branch, acts in response to the second bit in the selected field of the condition register. If the second bit is set, the branch is taken, otherwise, the branch is not taken and the sequential path is followed. In the above, the first branch instruction toggles, that is, changes direction each time it executes, making prediction difficult.

Thus, the first time the first branch instruction, the third instruction above, executes, the value in register G1 is 1, the initial value, and the value in register G0 is two from the previous "addic" instruction, instruction (1). Thus, the "cmp" instruction sets the first bit in the selected field, and instruction (3), the first branch instruction, is not taken, and the sequential path is followed, fetching the next fetch group, which begins with instruction (9), the second "addic" instruction.

Instructions (9)–(11) constitute a counter that counts up to the value of the contents of register G5, and the second branch, instruction (12), branches to instruction (2) with label "LB01". On returning to instruction (2), the contents of registers G0 and G1 are equal by virtue of the second "addic" instruction, instruction (9), which moves the contents of G1 to register G0. Because the contents of these registers are equal, the first "cmp" instruction sets the second bit in the selected field of the condition register, and the first "bc" branch instruction, instruction (3), is taken, whereby the flow returns to instruction (1) with label "LB00". Thus, in each of the iterations through the loop generated by the second fetch group, instructions (9)–(12), the first branch instruction, instruction (3), is executed twice and the direction toggles. In total the first branch instruction, instruction (3), is executed sixty-three times in the instant example in which the contents of register G5 equals thirty-two.

After an initial five mispredicts for the first branch, instruction (3), the path history becomes a repetition of the pattern "011". (The initial value of register G5 of thirty-two is sufficient to ensure that the global history vector settles to a steady state value. However, an artisan of ordinary skill would understand that other exemplary values could have been chosen. At any particular fetch of the first fetch group which includes the first branch, instruction (3), there are two possibilities for the global history vector, in an embodiment of the present invention in which the global history vector includes eleven bits. The history vector may either be "11011011011" or "01101101101".

In the two possible sequences of the global history vector, the prediction of the first branch is perfectly predictable in accordance with the principles of the present invention. In the first case, the prediction mechanism will predict not-taken because the mechanism determines that the next value to be shifted into the history vector is "zero". Similarly, in the second case, the mechanism of the present invention predicts "taken" because the mechanism determines that the next value to be shifted into the history vector is "one". In other words, the prediction mechanism in accordance with the principles of the present invention recognizes the pattern repetition in the history vector.

In sum, the present inventive concepts combine a local branch prediction mechanism with a fetch-based branch prediction mechanism while only requiring three tables. The selector table tracks the prediction performance of the fetch-based and bimodal branch history tables. Advantageously, the branch history table providing the better prediction performance can then be used to predict whether a branch instruction will be taken or not taken through the instruction pipelines.

Although the present invention and its advantages have been described in detail, it should be understood that various changes, substitutions and alterations can be made herein without departing from the spirit and scope of the invention as defined by the appended claims.

What is claimed is:

1. A processing system comprising:
   a first branch history table comprising a plurality of bimodally accessed entries for storing a first set of branch prediction bits;
   a second branch history table comprising a plurality of fetch-based accessed entries for storing a second set of branch prediction bits;
   a selector for selecting in response to a selection control bit selected from a set of selection control bits, a bit from a selected one of said sets of bits accessed from said first and second branch history tables; and
   a selector table comprising a plurality of entries for storing said a set of selector bits as a function of a performance history of said first and second sets of branch prediction bits stored in said first and second branch history tables, wherein said each said entry in said tables comprises a 1-bit counter.

2. Branch prediction circuitry comprising:
   a bimodal branch history table comprising a plurality of entries each for storing a prediction value and accessed by selected bits of a branch address;
   a fetch-based branch history table comprising a plurality of entries for storing a prediction value and accessed by a pointer generated from selected bits of said branch address and bits from a history register, each entry of the fetch-based branch history table operable for containing bits representing a prediction value for a plurality of branches in a fetch group, wherein each fetch group is represented by a bit in the history register; and
   a selector table comprising a plurality of entries each for storing a plurality of selection bits and accessed by a pointer generated from selected bits from said branch address and bits from said history register, each said selector bit used for selecting between a bimodal prediction value accessed from the bimodal history table and a prediction value accessed from said fetch-based history table.

3. The branch prediction circuitry of claim 2 and further comprising circuitry for updating said bimodal and fetch-based branch history tables operable to:
   set a corresponding entry in each of said bimodal and fetch-based branch history tables to a first value when a branch is taken at branch resolution time; and
   set a corresponding entry in each of said bimodal and fetch-based branch history tables to a second value when a branch is not taken at branch resolution time.

4. The branch prediction circuitry of claim 2 wherein said history register comprises a shift register and said branch prediction circuitry further comprises circuitry for updating said shift register by shifting in a preselected prediction value for each fetch group.

5. The branch prediction circuitry of claim 2 and further comprising circuitry for updating said selector table operable to:
   update a corresponding bit in a selected entry in said selector table with a first value when a bimodal prediction value from said bimodal branch history table correctly represents a corresponding branch resolution; and
   update a corresponding bit in a selected entry in said selector table with a second value when a fetch-based prediction value from said fetch-based branch history table correctly represents the corresponding branch resolution.

6. The branch prediction circuitry of claim 2 wherein the plurality of selection bits are operable for selecting a first subset of prediction values from the bimodal branch history table and a second subset of prediction values from the fetch-based branch history table.

7. The branch prediction circuitry of claim 4 wherein said circuitry for updating said selector table is further operable to maintain a value in a selected entry in said selector table when corresponding values from said bimodal and fetch-based branch history tables both correctly represent a corresponding branch resolution, and wherein said circuitry for updating said selector table is further operable to maintain a value in a selected entry in said selector table when neither values from said bimodal and fetch-based branch history tables correctly represent a corresponding branch resolution.

8. The branch prediction circuitry of claim 4 wherein said circuitry for updating said selector table is further operable to set a value in a selected entry in said selector table to a value associated with said fetch-based table when corresponding values from said bimodal and fetch based branch history tables both do not correctly predict a corresponding branch resolution outcome.

9. A processing system comprising:
   a first branch history table comprising a plurality of bimodally accessed entries, each entry for storing a first set of branch prediction bits;
   a second branch history table comprising a plurality of fetch-based accessed entries each entry for storing a second set of branch prediction bits;
   a selector for selecting, in response to a plurality of selection control bits, a set of prediction bits from a selected one of said sets of bits accessed from said first and second branch history tables; and
   a selector table comprising a plurality of entries, each entry for storing a plurality of selection control bits wherein the selection control bits are set as a function of a performance history of corresponding first and second sets of branch prediction bits stored in said first and second branch history tables.

10. The processing system of claim 9 wherein said entries of said selector table are accessed using fetch-based accessing.

11. The processing system of claim 9 wherein said each said entry in said tables comprises a 1-bit counter.

12. The processing system of claim 9 wherein said first and second branch history tables and said selector table form a portion of a branch execution unit.

13. The processing system of claim 12 wherein said branch execution unit forms a part of a microprocessor.

14. The processing system of claim 13 and further comprising memory coupled to said microprocessor.

15. A method of performing branch predictions in a processing system including a bimodal branch history table, a fetch-based branch history table and a selector table, the method comprising the substeps of:
    accessing the bimodal branch history table to retrieve a first set of branch prediction bits;
    accessing the fetch-based branch history table to retrieve a set of second branch prediction bits;
    selecting between the first and second sets of branch prediction bits in response to corresponding bits retrieved from the selector table, wherein a sum of a number of bits in the first set of branch prediction bits and a number of bits in the second set of branch prediction bits is not less than a number of instructions in a fetch group; and
    updating the selector table as a function of actual branch resolution.

16. The method of claim 15 wherein said step of updating the selector table comprises the substeps of:
    determining if at least one of the first set of branch prediction bits correctly predicts the corresponding branch resolution outcome;
    updating the corresponding entry in the selector table to a first logic value when the at least one of the first set of prediction bits correctly represents the branch resolution outcome;
    determining if at least one of the second set of branch prediction bits correctly predicts the branch resolution outcome; and
    updating the corresponding entry in the selector table to a second logic value when the at least one of the second set of branch prediction bits correctly represents the branch resolution outcome.

17. The method of claim 16 and further comprising the steps of:
    determining if at least one bit of both the first and second sets of branch history bits correctly predict the branch resolution outcome;
    maintaining the current value of corresponding bits in the corresponding selector table entry when the at least one bit of both the first and second sets of branch prediction bits correctly predict the branch resolution outcome;
    determining if at least one bit of both the first and second sets of branch prediction bits incorrectly predict the branch resolution outcome; and
    maintaining the current value of corresponding bits in the corresponding selector table entry when the at least one bit of both the first and second sets of branch history bits incorrectly predict the branch history outcome.

18. The method of claim 16 and further comprising the steps of:
    determining whether at least one bit of both the first and second sets of branch prediction bits correctly predict the branch resolution outcome;
    maintaining the current value of corresponding bits in the corresponding selector table entry when at the least one bit of both the first and second sets of branch prediction bits correctly predict the branch resolution outcome; and
    updating the current selector table entry to a logic value associated with the fetch-based branch history table when neither of corresponding bits of the first and second sets of branch prediction bits correctly predicts the branch resolution outcome.

19. The method of claim 15 wherein said step of accessing the fetch-based branch history table comprises the substep of generating an address from at least some bits of a branching instruction and bits retrieved from a history register.

20. The method of claim 19 wherein the history register comprises a shift register.

21. The method of claim 20 wherein said method further comprises the steps of updating the shift register by shifting in a prediction bit for each fetch group.

* * * * *